United States Patent
Hartlieb et al.

[11] Patent Number: 6,135,251
[45] Date of Patent: Oct. 24, 2000

[54] SHOCK ABSORBER FOR A MOTOR VEHICLE AND METHOD OF MAKING SAME

[75] Inventors: Markus Hartlieb, Walddorfhaeslach; Matthias Nohr, Stuttgart; Matthias Kroeger, Hannover; Karl Popp, Neustadt, all of Germany

[73] Assignee: DaimlerChrysler AG, Stuttgart, Germany

[21] Appl. No.: 09/173,699

[22] Filed: Oct. 16, 1998

[30] Foreign Application Priority Data

Oct. 16, 1997 [DE] Germany .......................... 197 45 656

[51] Int. Cl.$^7$ ...................................................... F16F 7/12
[52] U.S. Cl. ........................... 188/371; 188/374; 267/139
[58] Field of Search .................... 188/371, 374, 188/376, 377; 280/777; 293/132, 133; 267/139, 154

[56] References Cited

U.S. PATENT DOCUMENTS

| | | | |
|---|---|---|---|
| 3,482,653 | 12/1969 | Maki et al. | 188/374 |
| 3,705,742 | 12/1972 | Lipscomb | 293/89 |
| 3,789,948 | 2/1974 | Hrebicek | 180/91 |
| 3,814,470 | 6/1974 | Kicher et al. | 267/139 |
| 3,853,344 | 12/1974 | Shimoe | 267/154 |
| 4,929,008 | 5/1990 | Esfandiary | 293/108 |
| 4,988,081 | 1/1991 | Dohrmann | 188/371 |
| 5,427,214 | 6/1995 | Prottengeier et al. | 188/374 |

FOREIGN PATENT DOCUMENTS

| | | |
|---|---|---|
| 2441557A1 | 3/1976 | Germany . |
| 4037101A1 | 6/1991 | Germany . |
| 4121497C2 | 2/1993 | Germany . |
| 19633110A1 | 2/1997 | Germany . |

OTHER PUBLICATIONS

German Patent Office Action, Sep. 30, 1998.

*Primary Examiner*—Michael Mar
*Assistant Examiner*—Mariano Sy
*Attorney, Agent, or Firm*—Evenson, McKeown, Edwards & Lenahan, P.L.L.C.

[57] ABSTRACT

A shock absorber for a motor vehicle has a deformation body, which can be deformed in the case of a collision and into the path of which a blocking part protrudes, with which, due to the forces acting during a collision, a plastic deformation of the deformation body is achieved with absorption of the collision energy, it being possible to increase the deformation resistance of the deformation body by directing it into an additional deformation stage. For this purpose, the blocking body has at least two switched positions, in which it protrudes into the path of movement of the deformation body, as a result of which the deformation body is plastically deformed to a greater or lesser extent due to the forces acting during impact.

9 Claims, 2 Drawing Sheets

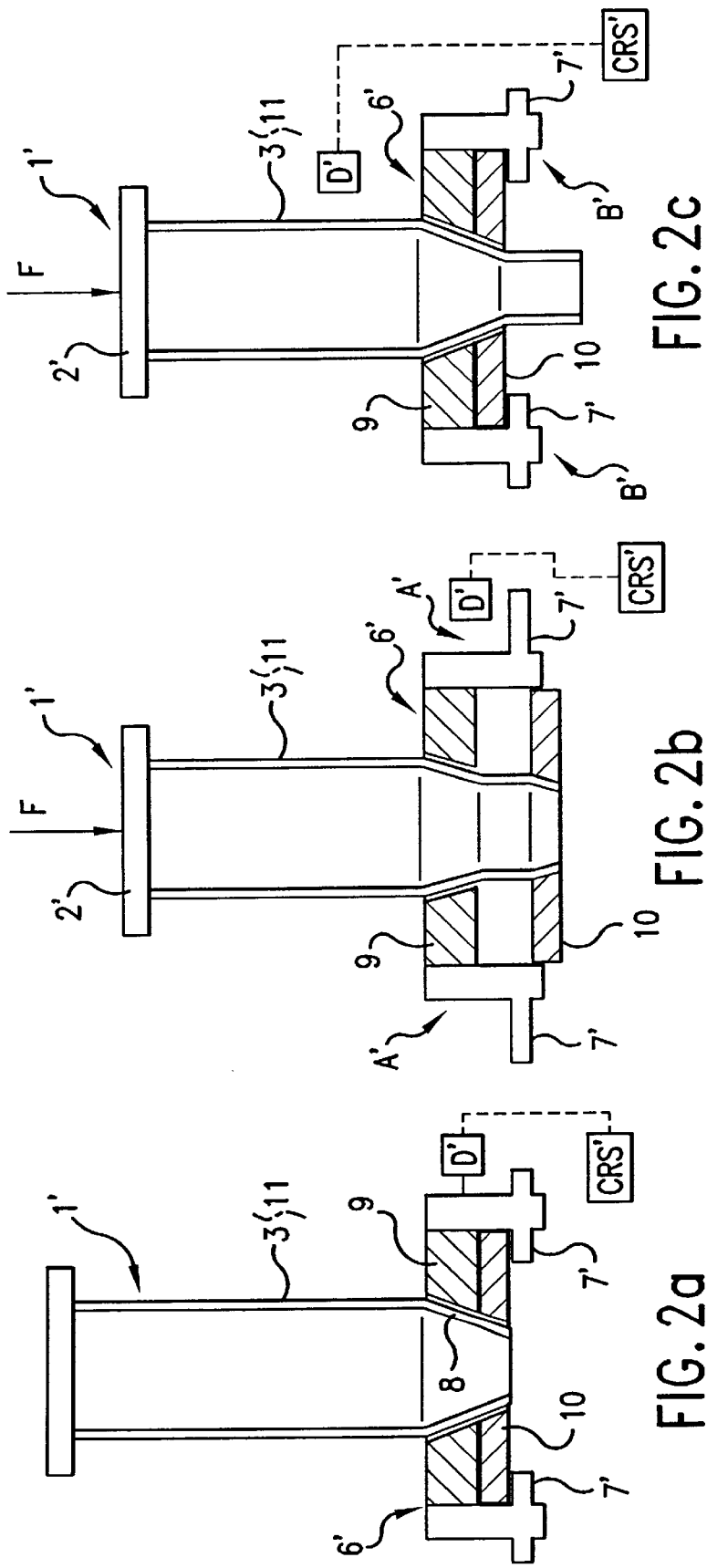

SHOCK ABSORBER FOR A MOTOR VEHICLE AND METHOD OF MAKING SAME

BACKGROUND AND SUMMARY OF THE INVENTION

This application claims the priority of German application 197 45 656.1-22, filed in Germany on Oct. 16, 1997, the disclosure of which is expressly incorporated by reference herein.

The invention relates to a shock absorber for a motor vehicle with a deformation body, which can be deformed in the case of a collision and into the path of which a blocking part protrudes, with which, due to the forces acting during a collision, a plastic deformation of the deformation body is achieved with absorption of the collision energy, it being possible to increase the deformation resistance of the deformation body by directing it into an additional deformation stage.

German Patent Document DE 196 33 110 describes a shock absorber for a bumper of a motor vehicle which includes two deformation elements of differing stiffnesses, which are acted as a function of the collision speed of the vehicle. At a predetermined driving speed, a less stiff deformation element is coupled to a stiffer deformation element, which would not yet be deformed at this driving speed. The stiffer deformation can be moved by a drive system into the deformation system, so that, when required, it can be added precisely at the correct time as a function of the measured collision values. The drive system as well must then be able to withstand the collision stresses, so that this arrangement can be achieved only at relatively great expense, if it is to be capable of functioning.

From German Patent Document DE 41 21 497 C2, a shock absorber with a piston-cylinder system is known, the piston movement of which is triggered upon impact and stopped when the piston attains a high displacement speed, after which the shock absorber absorbs the collision energy through plastic deformation. The piston can be stopped through detector-controlled, radially insertable locking pins or semi-circular locking elements, after which the shock absorber is deformed plastically. As a result, in the case of this shock absorber, only one deformation stage with plastic deformation is available for energy absorption in the case of vehicle collision.

From German Patent Document DE 40 37 101 A1, a shock absorber for a bumper in a motor vehicle is known, the outside pipe of which is deformable, in the case of a vehicle collision, an inertial mass acting on the outside pipe and the inertial induced displacement of the mass bringing about a change in the cross-sectional shape of the outside pipe. It is not possible to adjust the shock absorbing behavior.

In U.S. Pat. No. 3,789,948 A1, a shock absorber is described for the front end of a car, the damping spring of which is controlled so that it can be compressed with a low or a high expenditure of force as a function of the speed of the vehicle, as a result of which, in the case of a collision at higher speeds, the effect of the damping spring is maintained for a longer time. In order to change the spring resistance, an expensive adjusting mechanism is proposed here, which is continuously acted upon while the vehicle is in motion and which adjusts the spring resistance to the driving speed.

In U.S. Pat. No. 4,929,008 A1, a shock absorber is described, the collision energy decay of which is accomplished first in a is block, which can be deployed by being filled with gas, then in shear bolts and finally in a damping material, so that up to three damping processes are instituted, one after another, depending upon the force of the impact. The energy absorption is caused here by the initiating forces, and cannot be individually controlled.

It is an object of the invention to provide a deformation resistance for a generic shock absorber, which can be adapted to the impact of the vehicle and realized easily.

This object is accomplished according to preferred embodiments of the present invention by providing an arrangement wherein the blocking body has at least two switched positions, in which it protrudes into the path of movement of the deformation body, as a result of which the deformation body is plastically deformed to a greater or lesser extent due to the forces acting during impact.

In advantageous preferred embodiments of the invention, the crash absorber used in a stringer or a bumper mount is designed to be adjustable in its deformation resistance, before or during a vehicle collision, in response to the severity of the accident sensed by a pre-crash recognition or a vehicle sensor system.

Thus, the blocking part can be controlled through various measured values sensed at the time of collision, on the basis of the resulting crash values, or can be taken into account through a pre-crash recognition which, for example, takes into account the speed of the vehicle, the approach speed of the other object in the collision or its contour; and the deformation behavior of the shock absorber can be adapted to the severity of the accident before the collision.

The displacement of a blocking part into different positions, in which it leads to lesser or greater plastic deformation of the deformation element while absorbing collision energy by extending to different extents into the displacement path of the deformation body, represents a simple solution which can be manufactured cost-effectively for the design of the shock absorber.

The deformation behavior adapted to the collision leads to a reduction in injuries to the occupants, since the energy absorption can be optimized in the shock absorber. Furthermore, the control of the shock absorber can also take into account the crash compatibility of the vehicle with respect to the other vehicle involved, and the repair costs of vehicles equipped with this shock absorber can be positively affected.

A cost-effective design of the shock absorber is achieved through a deformation body, which includes at least two concentrically mounted pipes, which individually or together are prevented from moving by the blocking part, and therefore are plastically deformed upon impact. In another cost-effective embodiment, which can be manufactured at low costs, the blocking part includes at least two deforming bodies, which act consecutively and can protrude, optionally individually or together, to different extents into the path of displacement of the deformation body. The constructions can also be combined with each other.

Other objects, advantages and novel features of the present invention will become apparent from the following detailed description of the invention when considered in conjunction with the accompanying drawings.

BRIEF DESCRIPTION OF THE DRAWINGS

FIG. 2a is a schematic side sectional view of a further sample embodiment of a shock absorber constructed according to another preferred embodiment of the invention, shown in the starting position before a vehicle collision;

FIG. 2b shows the shock absorber of FIG. 2a at the time of vehicle collision, and with the deformation resistance set low; and FIG. 2c shows the shock absorber of FIG. 2a at the time of vehicle collision, and with the deformation resistance set higher.

DETAILED DESCRIPTION OF THE DRAWINGS

Figure 1A:
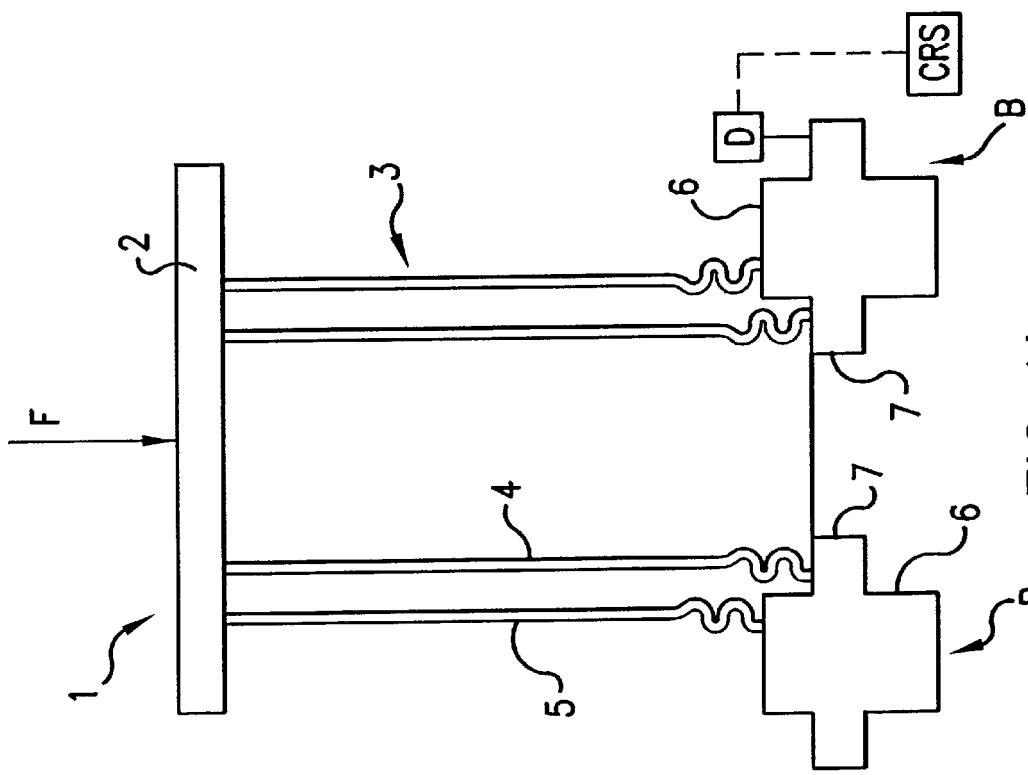
FIG. 1a is a schematic side sectional view of a shock absorber constructed according to a preferred embodiment of the invention shown during a vehicle collision with the deformation resistance set low.

In the drawings, a shock absorber 1, 1' is shown, as used in a bumper mount in a vehicle or as insert in a stringer, but which can, however, also be used elsewhere. In the case of a force (arrow F) acting on collision plate 2 or 2' in the event of a collision, it is the task of the shock absorber 1, 1' to absorb the collision energy by plastic deformation.

The shock absorber 1, 1' is designed in such a manner that its resistance to deformation can be controlled with at least two stages and thus the shock absorber 1, 1' can be adapted to the severity of the accident. After recognition of the collision by schematically depicted collision recognition sensors (CRS), which determine collision data before the collision as pre-crash recognition, for example, through imaging systems or during the collision, there are, due to the possibility of switching, two different longitudinal stiffnesses, as a result of which there is a lesser or greater absorption of energy during the plastic deformation of the shock absorber 1, 1'.

The deformation behavior adapted to the collision leads to a reduction in the injuries to the occupants, since the energy absorption is optimized in the shock absorber 1, 1'. Furthermore, by controlling the shock absorber 1, 1', the crash compatibility of the vehicle with respect to another vehicle in a collision can be taken into account and the repair costs of the vehicle equipped with this shock absorber 1, 1' can also be affected positively.

Figure 1B:
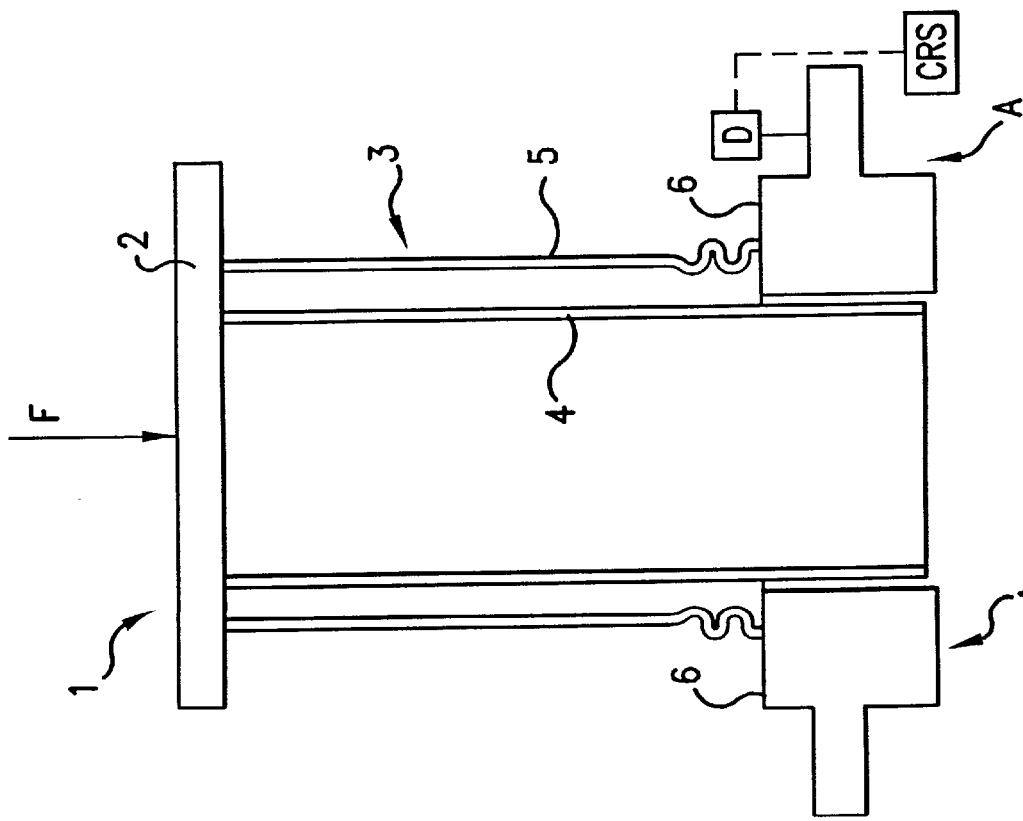
FIG. 1b shows the shock absorber of FIG. 1a with the deformation resistance set higher.

In FIG. 1a and 1b, in which the shock absorber 1 is stressed with a collision force F, the shock absorber 1 adjoins the collision plate 2 and absorbs the force acting thereon. The shock absorber 1 comprises as deformation bodies 3, two concentrically placed pipes 4 and 5, which can be deformed plastically individually or together. The plastic deformation is achieved using a blocking part 6, which extends into the path of displacement of the deformation body 3 and therefore can prevent body 3 from being displaced axially. Blocking part 6 is supported at the vehicle body structure.

In the first switched position A of FIG. 1a, the blocking part 6 is in the path of the outer pipe 5 and has a deforming effect on it when the shock absorber 1 is struck by the collision force F. The inside pipe 4 is not prevented from moving axially. In this position of the blocking part 6, the shock absorber 1 reacts softly, which is sufficient for energy absorption in a less severe collision. In a differently designed embodiment, it is contemplated to place the blocking part in the path of the inner pipe when the deformation body switched for a soft collision and to lead the outside pipe past the inner pipe.

In the case of a severe impact, the blocking part 6, as shown in FIG. 1b, is then transferred into the switched position B, in which a pusher 7, moved by a schematically depicted drive mechanism D, protrudes into the path of the internal pipe 4, as a result of which the resistance to deformation in this additional deformation stage is increased. The blocking part 6 can be placed in any predeterminable position on the periphery of the deformation body 3, and leads to a shock absorber 1, which can be manufactured cost effectively, has a simple structure and functions well and the deformation behavior of which can be switched.

A further example is shown in FIGS. 2a, 2b and 2c, in which the deformation body 3' of the shock absorber 1' comprises a pipe 11, which extends with a tapered portion on the free end 8 into a cone of a blocking part 6' when the shock absorber 1' is not stressed. The blocking part 6' comprises radially movable pushers 7', by means of which, in the position shown, aside from an annular deforming body 9 attached to the blocking part, also an annular deforming body 10 is held axially immovably in position. The deforming body 9, at its narrowest cross section, has a larger diameter than the deforming body 10. As a result, during the axial displacement of the deformation body 3' resulting from the stressing of the collision plate 2' during the collision of the vehicle, the pipe 11 is constricted less by the stationary deforming body 9 than by the stationary deforming body 10. Aside from a constriction of the pipe 11 with an enlargement of the wall thickness, axially displaceable deforming bodies can also be used, which have a deforming effect on the pipe 11.

In the case of a shock absorber 1', which is set to soft on the basis of a measurement signal from collision recognition sensor (CRS') during a vehicle collision, the pipe 11, as shown in FIG. 2b, is pressed and deformed due to the force (Arrow F) of the collision by the conically constricting borehole of the deforming body 9. On the other hand, the deforming body 10 is released by the drive mechanism D' and pusher 7', which is pushed back into the switched position A' of blocking part 6' and moves, along with the pipe 11, without having a deforming effect on this pipe. As a result, the deformation of the deformation body 3' is initiated here and, with that, the energy absorbed during collision is less than is the case of the collision body 1', which is set harder, as in FIG. 2c. Here, the deforming body 10 is fixed axially immovably by the pusher 7', which is pushed forward into the switched position B' of the blocking part 6' by the schematically depicted drive mechanism D'. With that, the pipe 11 is pressed into an additional deformation stage by the narrower hole of the deforming body 10 that now follows.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shock absorber for a motor vehicle with a deformation body, which can be deformed in the case of a collision into A path of which a blocking part protrudes, with which, due to the forces acting during a collision, a plastic deformation of the deformation body is achieved with absorption of the collision energy, it being possible to increase the deformation resistance of the deformation body by directing it into an additional deformation stage, wherein the blocking part is movable into at least two switched positions by a drive mechanism, in which the blocking part protrudes into the path of movement of thee deformation body, as a result of which the deformation body is plastically deformed to either a greater or lesser extent depending upon the selected switched position of the blocking part due to the forces acting during impact.

2. The shock absorber of claim 1, wherein the blocking part is moved to the switched positions by the drive mechanism on the basis of a measured collision value.

3. The shock absorber of claim 1, wherein the blocking part is moved to the switched positions by the drive mechanism on the basis of a pre-crash recognition.

4. The shock absorber of claim 1, wherein the deformation body comprises at least two concentrically placed pipes, which, individually or together, are prevented from being shifted by the blocking part.

5. An impact damper assembly for a motor vehicle, comprising:

an impact plate; a plurality of collision force absorbing deformable parts interposed between the impact plate and vehicle body structure and operable to resist movement of the impact plate toward the body structure; and a movable blocking part operable to selectively engage the selected ones of the deformable parts such that movement of the impact plate toward the body structure during collision conditions of different magnitudes are resisted by different ones of the deformable parts.

6. Impact damper assembly according to claim 5, comprising a collision recognition sensor system and a driving means for the blocking part which is controlled by said collision recognition sensor system.

7. Impact damper assembly according to claim 5, wherein said deformable parts are concentric tubular members and said blocking part is movable between respective positions in a radial direction with respect to the concentric tubular members.

8. A method of making an impact damper assembly for a motor vehicle, comprising:

providing an impact plate;

interposing a plurality of collision force absorbing deformable parts between the impact plate and vehicle body structure so as to be operable to resist movement of the impact plate toward the body stricture; and providing a blocking part operable to selectively engage the selected ones of the deformable parts such that movement of the impact plate toward the body structure during collision conditions of different magnitudes are resisted by different ones of the deformable parts.

9. A method according to claim 8, wherein said deformable parts are concentric tubular members and said blocking part is movable between respective positions in a radial direction with respect to the concentric tubular members.

* * * * *